(12) United States Patent
Richards (10) Patent No.: US 8,236,092 B1
(45) Date of Patent: Aug. 7, 2012

(54) PRESSURE GRADIENT GAS SCRUBBER APPARATUS AND METHOD

(76) Inventor: Clyde N. Richards, San Diego, CA (US)

( * ) Notice: Subject to any disclaimer, the term of this patent is extended or adjusted under 35 U.S.C. 154(b) by 0 days.

(21) Appl. No.: 13/135,109

(22) Filed: Jun. 27, 2011

(51) Int. Cl.
  *B01D 47/06* (2006.01)
(52) U.S. Cl. ............... 95/216; 95/221; 96/297; 96/300; 96/360; 96/362
(58) Field of Classification Search ............ 96/270–271, 96/273, 277, 280, 297, 300, 322, 355–357, 96/360
See application file for complete search history.

(56) References Cited

U.S. PATENT DOCUMENTS

| | | | | |
|---|---|---|---|---|
| 537,509 | A | * | 4/1895 | Waddle ............... 261/76 |
| 997,581 | A | * | 7/1911 | Prinz ................. 96/297 |
| 1,966,280 | A | * | 7/1934 | Bingman ............. 96/357 |
| 3,181,287 | A | * | 5/1965 | Rabson .............. 96/357 |
| 3,427,227 | A | * | 2/1969 | Chamberlin .......... 202/173 |
| 3,631,656 | A | * | 1/1972 | Hausberg et al. ...... 96/356 |
| 3,653,185 | A | * | 4/1972 | Scott et al. .......... 96/16 |
| 3,656,440 | A | | 4/1972 | Grey |
| 3,765,153 | A | | 10/1973 | Grey |
| 3,785,127 | A | * | 1/1974 | Mare ................. 96/297 |
| 4,247,308 | A | | 1/1981 | Calvert et al. |
| 4,334,897 | A | * | 6/1982 | Brady et al. ......... 96/356 |
| 4,484,937 | A | * | 11/1984 | James et al. ......... 96/234 |
| 4,668,256 | A | * | 5/1987 | Billiet et al. ........ 96/409 |
| 4,744,958 | A | * | 5/1988 | Pircon .............. 422/606 |
| 5,314,529 | A | * | 5/1994 | Tilton et al. ......... 96/204 |
| 5,403,568 | A | | 4/1995 | Stowe, Jr. |
| 5,759,233 | A | * | 6/1998 | Schwab .............. 95/8 |
| 6,156,098 | A | * | 12/2000 | Richards ............. 95/65 |
| 6,551,382 | B1 | * | 4/2003 | Richards ............. 95/66 |
| 6,562,304 | B1 | * | 5/2003 | Mizrahi ............. 422/171 |
| 6,986,803 | B1 | * | 1/2006 | Richards ............. 95/71 |
| 7,022,166 | B2 | * | 4/2006 | Gittler .............. 96/64 |
| 7,645,430 | B2 | | 1/2010 | Ghosh et al. |
| 7,708,803 | B2 | * | 5/2010 | Berry et al. .......... 95/59 |
| 2002/0110511 | A1 | | 8/2002 | Klingspor et al. |
| 2010/0175552 | A1 | * | 7/2010 | Ghosh et al. ......... 95/23 |
| 2010/0229510 | A1 | * | 9/2010 | Heinen et al. ........ 55/322 |

FOREIGN PATENT DOCUMENTS

JP  57102300  * 6/1982
JP  57102300 A  * 6/1982

* cited by examiner

*Primary Examiner* — Duane Smith
*Assistant Examiner* — Ives Wu
(74) *Attorney, Agent, or Firm* — Robert W. Harris (57) ABSTRACT

A gas scrubber employing liquid droplets injected into a flowing gas stream at a higher velocity than the gas velocity, having means to create a gradient of increasing pressure downstream from the droplet injection site, which gradient decelerates the gas and thereby increases the velocity of the droplets relative to the gas, thus increasing the total path length of the droplets through the gas, so as to allow substantial increase of scrubber collection efficiency without use of increased scrubber size or increased liquid droplet flow rate.

2 Claims, 5 Drawing Sheets

FIG. 6

PRESSURE GRADIENT GAS SCRUBBER APPARATUS AND METHOD

BACKGROUND OF THE INVENTION

The present invention pertains to apparatus and methods for cleaning gases, including gases contaminated by particulate and/or gaseous contaminants. In the arts concerned with gas cleaning there are numerous disclosures of gas scrubber apparatus and methods in which charged or uncharged liquid droplets are injected into a flowing stream of contaminated gas, with an injection velocity greater than the gas flow velocity, so that contaminant particles or gases may be removed by the scrubbing effect of the droplets on the contaminated gas, and in which the droplets carrying absorbed contaminants are then removed from the gas stream by various forms of demisting apparatus or methods, so as to remove contaminants from the gas stream, to the extent of the scrubbing efficiency of the apparatus or method.

Examples of such apparatus and methods involving use of charged liquid scrubbing droplets are disclosed in applicant's prior U.S. Pat. Nos. 6,156,098; 6,551,382; and 6,986,803.

The efficiency of a gas scrubber in removing contaminants from the gas stream clearly depends strongly on the total number of collisions between liquid droplets and the gas molecules or contaminant particulates. The number of collisions of course depends both on the liquid droplet flow rate and the path length of the motion of the droplets through the gas. One obvious way to increase overall gas scrubber efficiency would be to increase the liquid droplet flow rate. This approach is suggested in prior art, e.g. in two of applicant's above-referenced patents, pointing out the dependence of collection efficiency on the number of liquid droplets, U.S. Pat. No. 6,156,098, col. 2, lines 25-32; U.S. Pat. No. 6,551,382, col. 1, lines 40-45. Another obvious manner of increasing collection efficiency would be to increase the path length for droplet motion through the gas by increasing the size of the gas scrubber apparatus. This approach is suggested by applicant's U.S. Pat. No. 6,156,098 at col. 10, lines 54-57, pointing out the dependence of the gas volume swept out per liquid droplet on the average length of travel of the droplets through the gas. But this approach is of limited practical value, because multiple stages would be required to achieve a significant path length increase, since in a given stage the higher speed droplets quickly decelerate, due to drag from droplet/gas molecule collisions, while those collisions also accelerate the gas velocity, so that the droplets and gas quickly attain the same speed, with zero relative speed, and multiple stages would involve greater complexity and cost for the scrubber apparatus.

In the course of his work with gas scrubbers used in varying applications and environments, applicant has realized a need for improving gas scrubber efficiency without having to use either a higher droplet flow rate or a larger scrubber apparatus. There are applications for gas scrubbers, for example shipboard applications, in which limitations of available scrubber space and liquid storage space may preclude effective use of either of these approaches. One application for smaller scrubbers would be in engine exhaust cleaning apparatus for ferries.

Applicant's present invention allows a significant increase of gas scrubber efficiency in an unexpected manner, without employing either an increased droplet flow rate or a larger gas scrubber apparatus. This unexpected result is achieved through a synergistic interaction of the liquid droplet injection, with an effect of a pressure-drop plate downstream from the droplet injection site, which pressure-drop plate has an adjustable gas flow constriction causing an adjustable pressure drop across the pressure-drop plate, resulting in an adjustable gradient of increasing gas pressure in the downstream direction from the droplet injection site to the pressure-drop plate.

As already noted, the liquid droplets are injected with an injection velocity greater than the gas flow velocity. The path length for droplet interaction with gas, is the path length for motion of the droplets relative to the gas. This path length will be affected by the relative velocities of the droplets and the gas.

For typical gas scrubbers, the initial liquid droplet spray momentum flux is about an order of magnitude greater than the initial gas momentum flux (momentum flux being droplet or gas momentum entering the scrubber per unit time and per unit cross sectional area of the scrubber).

Due to viscous drag forces on the droplets decelerating the droplets, and momentum transfer from the droplets to the gas, the liquid droplet momentum flux will accelerate the gas velocity, so as to decrease the relative velocity of the droplets and gas. In the absence of the pressure-drop plate and its resulting pressure gradient, the relative velocity of the droplets and gas will decrease rapidly across the scrubbing region, thus limiting the effective relative droplet-gas motion path length for droplet-gas interaction.

But with the presence of the pressure-drop plate, the gradient of increasing pressure in the gas flow direction will decelerate the gas flow velocity, already less than the droplet velocity, so as to increase the relative velocity of the droplets and the gas, and thus increase the effective relative droplet-gas motion path length, resulting in increased collection efficiency due simply to the pressure gradient effect on relative droplet and gas motion. As detailed below, reasonable values of other operating scrubber parameters allow collection efficiency increase from 70% to 99%, due simply to the adjustable pressure gradient effect, without any need to increase the liquid droplet flow rate or increase the size of the gas scrubber.

It is not the intent of this application, by stating that certain embodiments of the present invention are suited to certain purposes or to dealing with certain problems, to necessarily limit the scope of the invention to only embodiments which are useful for said purposes or problems; it is instead the intent that the scope of the invention be determined by the claims as more fully stated below.

SUMMARY OF THE INVENTION

As a summary, this section of course does not explicate the invention in all the detail of the subsequent detailed description and claims. It is intended that the relative brevity of this summary shall not limit the scope of the invention, which scope is to be determined by the claims, properly construed, including all subject matter encompassed by the doctrine of equivalents as properly applied to the claims.

For brevity the term "gas scrubber" will hereafter, unless otherwise specifically indicated, denote an apparatus in which liquid droplets are injected at a droplet injection site into a flowing stream of gas bearing particulate and/or gaseous contaminants, said droplets being injected in a direction at least substantially parallel to the gas flow direction, with an injection velocity greater than the gas flow velocity, and in which demisting apparatus downstream from the droplet injection site removes droplets from the flowing gas stream after they have absorbed contaminants from the gas stream to the extent allowed by the efficiency of the apparatus.

In one broad aspect the invention is a gas scrubber having an adjustable pressure gradient means for creating an adjustable gradient of increasing gas pressure downstream from the site of injection of the liquid droplets, with said pressure gradient adjusted to a magnitude sufficiently reducing the gas velocity and sufficiently thereby increasing the relative velocity of the liquid droplets and the gas, so as to substantially increase the total path length of gas traversed by the liquid droplets.

In one broad aspect of the invention said means for creating said adjustable gradient of increasing gas pressure comprises a pressure-drop plate downstream from said droplet injection site, said pressure-drop plate comprising a pair of parallel plates oriented at least substantially transverse to said flowing stream of gas, said plates having each having a plurality of openings allowing flow of gas through said plates, with said openings of said plates being offset from one plate to the other by an adjustable amount.

In another broad aspect the invention is a method for improving the contaminant collection efficiency of a gas scrubber, by calculating and applying a gradient of increasing gas pressure downstream from the site of injection of the liquid droplets, with said pressure gradient adjusted to a magnitude sufficiently reducing the gas velocity and thereby sufficiently increasing the relative velocity of the liquid droplets and the gas, so as to substantially increase the total path length of gas traversed by the liquid droplets.

BRIEF DESCRIPTION OF THE DRAWINGS

In the drawings, which all illustrate a single embodiment of a gas scrubber employing the invention (except for FIG. 5 which relates to prior art).

DETAILED DESCRIPTION

Those familiar with the art will understand that the invention may be employed in varied embodiments, for various specific purposes, without departing from the essential substance thereof. The description of any one embodiment given below is intended to illustrate an example rather than to limit the invention. This section is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

With reference to gas scrubbers as defined in the above summary section, application of the present invention is not limited to any particular form of gas scrubber, and the present invention should not be construed as limited to any such particular gas scrubber. For example, the present invention may be employed with any of the various forms of gas scrubbers disclosed in applicant's prior U.S. Pat. Nos. 6,156,098; 6,551,382; and 6,986,803, the disclosures of which patents are incorporated herein by this reference.

Figure 1:
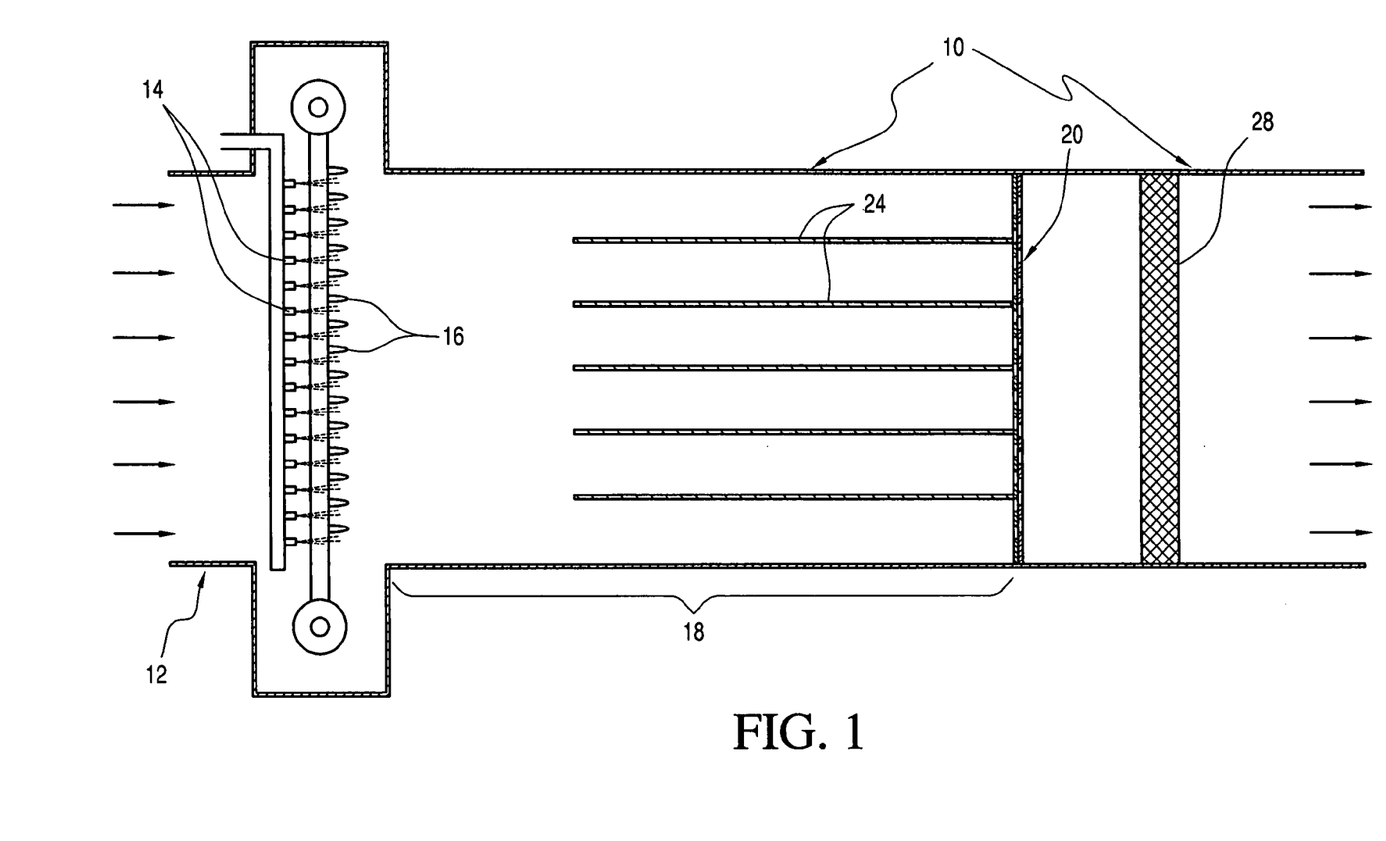
FIG. 1 is a plan view of the pressure gradient gas scrubber.
Figure 2:
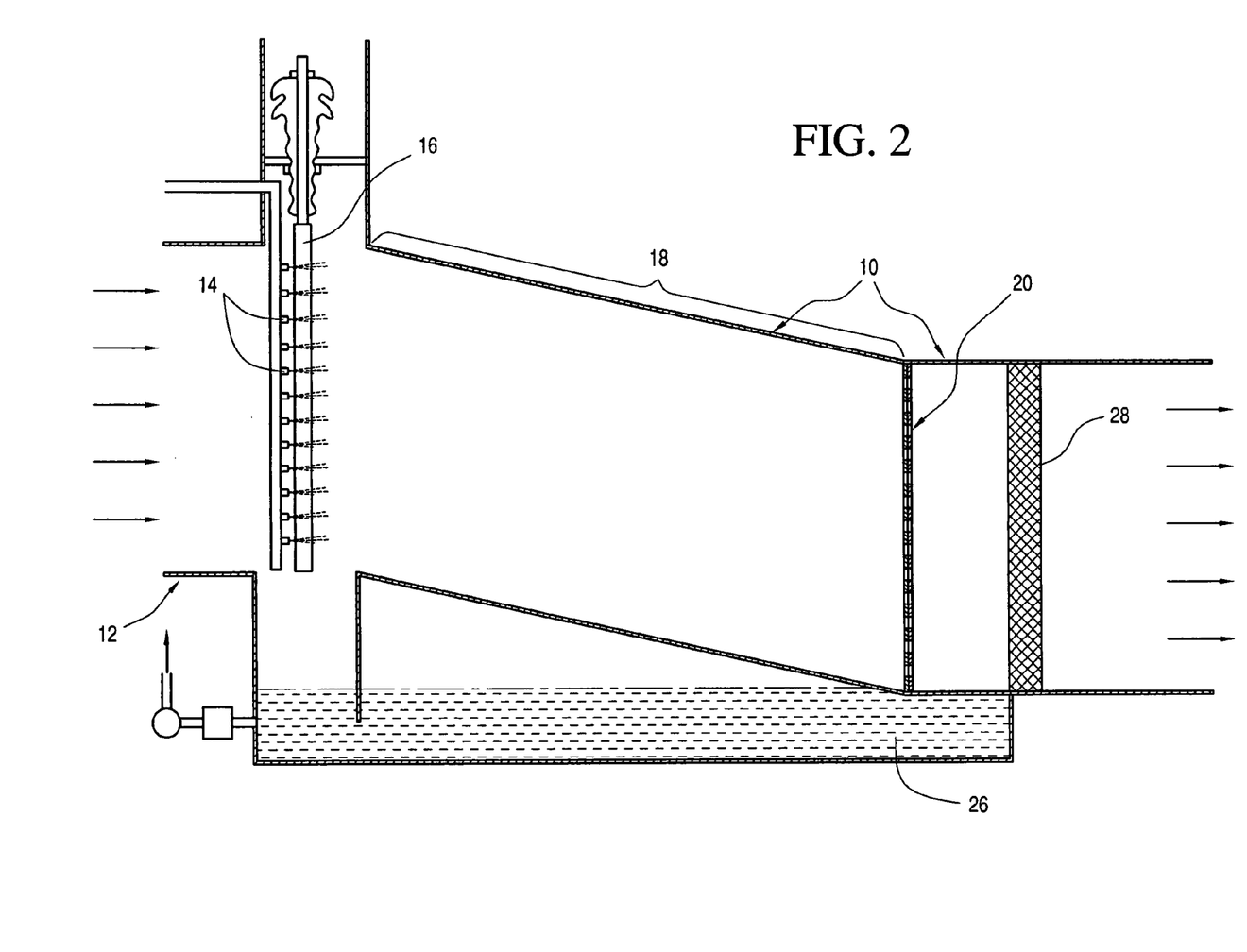
FIG. 2 is an elevational view of the pressure gradient gas scrubber.
Figure 3:
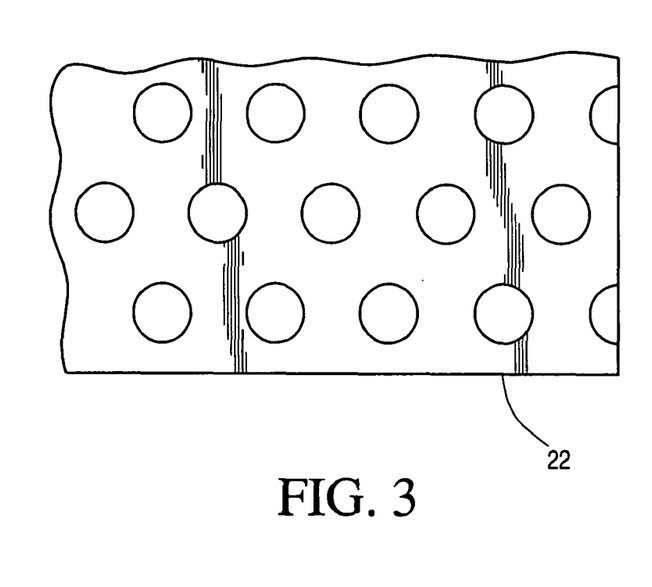
FIG. 3 a detailed view of a section of one of two identical perforated sheets comprising the adjustable pressure-drop plate.

Referring now to the drawings, in which like reference numbers denote like or corresponding elements, in one embodiment the gas scrubber employing the present invention is contained within a housing chamber 10 in which the gas flow is at least substantially horizontal. The gas flow may be created by fans (not shown) located either before or after housing chamber 10. The contaminated gas to be scrubbed enters housing chamber 10 through gas inlet 12, and passes through an array of flat spray nozzles 14 which spray electrically charged liquid drops into the gas in a direction which is at least substantially the same as that of the gas flow. The width and height of the gas inlet 12 are such that gas inlet 12 is just slightly larger than the array of spray nozzles 14. The electrically charged liquid droplets may be created by means such as disclosed in applicant's U.S. Pat. No. 6,156,098, using induction electrodes 16 seen in FIG. 1 of the present invention drawings.

The gas containing the sprayed liquid droplets then passes into a scrubbing chamber 18, having a cross section at least approximately the same as that of gas inlet 12. The minimum length of scrubbing chamber 18 should be about 2 meters.

Figure 4:
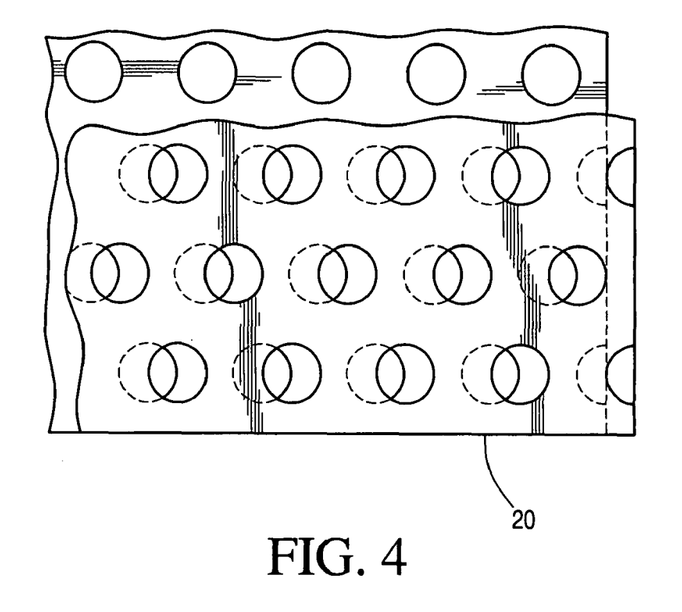
FIG. 4 is a detailed view of a section of the pressure-drop plate, showing the openings in the two perforated sheets of the pressure-drop plate being displaced from one another by one radius of the perforations.

The scrubbing chamber 18 terminates at a pressure-drop plate 20, consisting of two identical perforated sheets 22 oriented at least substantially transverse to the gas flow direction, through the perforations of which the gas flows in a constricted flow in exiting scrubbing chamber 18, with the perforated sheets 22 being adjustable in relative position in a direction transverse to the gas flow direction, by an adjustment means (not shown), so that the perforated sheets 22 may be aligned for a minimum pressure drop across pressure-drop plate 20, or misaligned for a greater pressure drop across pressure-drop plate 20, as seen in FIG. 4.

As the gas passes through scrubbing chamber 18, it passes through separate zones formed by a plurality of thin vertical sheets 24, extending from the bottom to the top of scrubbing chamber 18. The vertical sheets 24, preferably separated by 4 to 8 inches, serve to prevent large scale oscillatory side-to-side oscillatory flow of the streaming gas.

As the liquid contained within the streaming gas flow impinges upon pressure-drop plate 20, much of it falls into a liquid sump 26; the remaining liquid is removed by a mist eliminator 28 after the gas exits scrubbing chamber 18.

Operating Conditions Affecting Collection Efficiency

As taught in applicant's U.S. Pat. No. 6,156,098, at Col. 10, line 25-Col. 11, line 25, there is a simple scaling relationship for scrubber collection efficiency for particulates or contaminant gases, set forth as follows in the cited portion of said patent:

"If $\Omega$ denotes the overall particulate removal efficiency, if the droplets acted independently of one another in particulate collection, i.e. the collection efficiency for very low efficiencies, $$\Omega = \text{(Volume effectively swept per droplet)} \times \text{(Number of droplets)}/\text{(Volume of gas in chamber)}.$$

So for steady state conditions, $$\Omega = \text{(Volume effectively swept per droplet)} \times \text{(Droplet production rate)}/\text{(Volume flow rate of gas through chamber)}.$$

Let E denote the collection efficiency per droplet, defined as the fraction of the droplet cross sectional area for which all particulates in the droplet path are collected, which is much smaller than unity, for the reasons already discussed above in the background physics section, E being about one in ten thousand for uncharged droplets, and being about 0.1 for applicant's charged droplets using the monopole—dipole force particulate collection process, as noted above. And let $V_g$ denote the volume flow rate of gas flowing through chamber 10, and $V_1$ the liquid volume flow rate. Letting r denote the average radius of the droplets 22, then obviously $$V_1=(4/3)\pi r^2\times(\text{Droplet production rate}),\text{ or}$$

$$(\text{Droplet production rate})=V_1/((4/3)\pi r^2)$$

If L denotes the average length of travel of the droplets 22 through the gas, for the droplet motion relative to the gas, then, by the definition of E, the $$\text{Volume effectively swept per droplet}=L\times\pi r^2\times E.$$

It follows that $$\Omega=(3/4)\times(V_1/V_g)\times(L/r)\times E.$$

Or, expressing the overall particulate collection efficiency formula, for low efficiencies, in terms of the droplet diameter d=2r, $$\Omega=1.5\times(V_1/V_g)\times(L/d)\times E.$$

However, Ω would only be the collection efficiency if the droplets acted independently of one another, which would only be approximately true for very small collection efficiencies. If the collection efficiency is not small, the number of particulates collected by a given droplet will be reduced due to the particulate collection by earlier droplets. It can be shown that the overall particulate collection efficiency Γ of the device is actually given by $$\Gamma=1-e^{-\Omega}$$

for the case of nonsmall collection efficiency. Some corresponding values of the dimensionless efficiency Γ and the dimensionless parameter Ω are:

| Ω | Γ (%) |
|---|---|
| 1 | 63 |
| 2 | 86 |
| 3 | 95 |
| 4 | 98 |
| 5 | 99 |
| 7 | 99.9 |
| 10 | 99.995" |

(end of cited section of U.S. Pat. No. 6,156,098)

In operation of the present invention, the operator adjusts the misalignment of the perforated sheets 22 until the pressure difference across pressure-drop plate 20 is at least substantially equal to $$\text{Delta }P=(\text{MFR})/A)(2p_1/d_1)^{1/2}$$

where MFR is the mass flow rate of the pressurized injected fluid, A is the cross sectional area of the scrubbing chamber 18, $p_1$ is the pressure at which the liquid is injected into spray nozzles 14, and $d_1$ is the mass density of the injected liquid.

This setting of the pressure drop across pressure-drop plate 20 will cause the pressure drop to be substantially equal to or greater than the initial liquid spray momentum flux.

Conservation of Momentum

The liquid spray injected into the gas has a certain momentum flux, which for typical gas scrubbers is about an order of magnitude greater than the initial gas momentum flux. By Newton's second law, the sum of these momenta is conserved unless the gas and liquid are acted upon by some force, e.g. a pressure gradient. There will of course be an exchange of momentum between the liquid droplets and the gas (due to viscous drag forces) since the liquid droplets are injected at a higher velocity than that of the gas.

Liquid Spray Momentum Flux

The liquid spray momentum flux is of course $$\text{LSMF}=(\text{MFR})(v/A)$$

where MFR is, as previously, the mass flow rate of the liquid spray (kg/sec), v is the velocity of the injected liquid (m/sec), and A is, as previously, the cross sectional area of the spray in square meters, which equals the cross sectional area of scrubbing chamber 18.

Using the scrubber of applicant's U.S. Pat. No. 6,156,098 as an example, the liquid spray momentum flow rate for each of the nozzles cited in that patent is about 0.44 Newtons (0.1 lb). This translates into an initial liquid spray momentum flux (LSMF) of about 137 Pascals (0.02 lb/sq. in. or 0.55 inches of water column). The effect of the injected sprays in that example is to add a thrust per unit area (equivalent to a pressure) in the direction of the fluid injection, which is the same direction as the gas flow.

In the same scrubber of applicant's U.S. Pat. No. 6,156,098, the initial gas momentum flux is about 14 Pascals (0.002 lb/sq.in. or about 0.056 inches of water column). So for that scrubber, as for typical gas scrubbers generally, the liquid spray momentum flux is about an order of magnitude greater than the initial gas momentum flux.

Momentum Transfer and Efficiency Calculations

Applicant has performed computer simulation calculations, which take account of the effects of both momentum transfer from the injected droplets to the slower-moving gas, and the deceleration of the gas due to the gradient of increasing pressure downstream from the fluid droplet injection site at spray nozzles 14, said gradient caused by the pressure differential across pressure-drop plate 20, and has carried out said calculations for the case in which a suitable pressure gradient exists, and, for comparison, also for the case with no pressure gradient is present, i.e. in the absence of the pressure-drop plate 20 at the end of scrubbing chamber 18.

In calculating the momentum transfer from the liquid spray droplets to the slower-moving gas, the program uses the viscous drag force experienced by a droplet moving through the slower-moving gas, which force is given by $$F_D=C_D(\pi/2)d_v r^2(v_d-v_g)^2,$$

where $C_D$ is the drag coefficient, $d_v$ is the gas density, r is the drop diameter, $v_d$ is the drop velocity, and $v_g$ is the gas velocity, $(v_d-v_g)$ being the relative velocity of the drops, relative to the gas. The direction of the drag force is always opposite to the relative velocity, and the drag coefficient $C_D$ is a function of the Reynolds number Re, defined by $$Re=2d_g r ABS\cdot VAL\cdot(v_d-v_g)/\mu,$$

where μ is the coefficient of viscosity of the gas.

For various ranges of the Reynolds number Re, the drag coefficient is given by:

$C_D$=24/Re for Re less than or equal to 1, $C_D=(24/Re)(1+Re^{2/3}/6)$ for Re greater than 1 but not greater than 1000, and $C_D$=0.44 for Re greater than 1000

(The reader is referred to Microphysics of Clouds and Precipitation by Pruppacher & Klett, or *Aerosol Technology* by Hinds for further details on viscous drag forces on liquid drops moving through gases.)

Applicant's computer program approximates the size distribution of the liquid drops using measured nozzle exit data, then dividing the drops into 22 size classes. Each of these droplet size classes is given an initial injection velocity according to the nozzle pressure.

The initial velocity of the gas is known from the cross sectional area of scrubbing chamber 18 and the volume flow rate of the gas.

Then the motion of each droplet size class is calculated at small time intervals of the order of 10 microseconds as the gas and entrained liquid droplets move downstream, and from these calculations the following are determined:

(a.) The change in velocity and momentum of each size class;

(b.) The change in the size distribution of the drop-drop collisions, by calculations of the drop/drop collisions of different size classes;

(c.) The change in the velocity and momentum of the gas, assuming that the pressure gradient was constant from the point of injection of the drops to the pressure drop plate; and (d.) The value of $\Omega$ (see above) for each of the drop size classes, obtained by adding the values of $\Omega$ for the different size classes.

Computer Simulation Results

Figure 5:
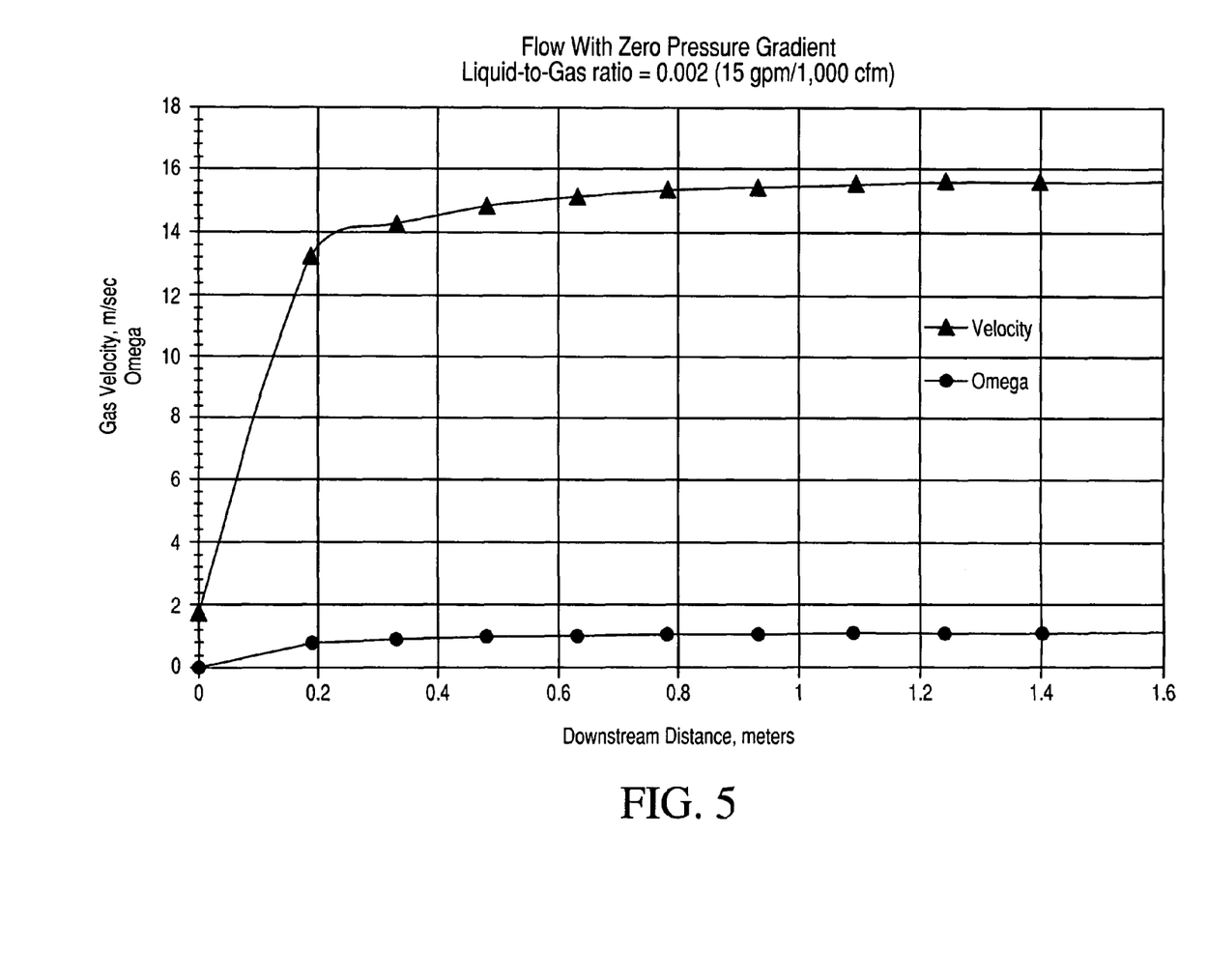
FIG. 5 is a plot of the gas velocity and scrubbing efficiency parameter inside a typical gas scrubber not employing the present invention, calculated by a computer simulation program.

FIG. 5 shows the computer simulation results for a gas scrubber having all operating parameters within 1% Of those described in applicant's U.S. Pat. No. 6,156,098 where the gas/liquid droplet mixture flows into a scrubbing chamber 18 with cross sectional dimensions greater than the initial cross section at the location where the liquid is injected, and where there is no flow constraint like pressure-drop plate 20 at the end of the scrubbing chamber 18. This figure shows that about 1 meter downstream, the gas velocity has increased to about 15 m/sec. and the value of $\Omega$ has risen to about 1.2. However neither the gas velocity nor $\Omega$ change significantly further downstream. $\Omega$ changes little because both the gas and most of the liquid droplets are travelling at the same velocity of about 15 m/sec from that location onward, so that there is little relative motion between the liquid and the gas. A value of 1.2 for $\Omega$ yields a scrubber efficiency of about 0.70 or 70%.

Figure 6:
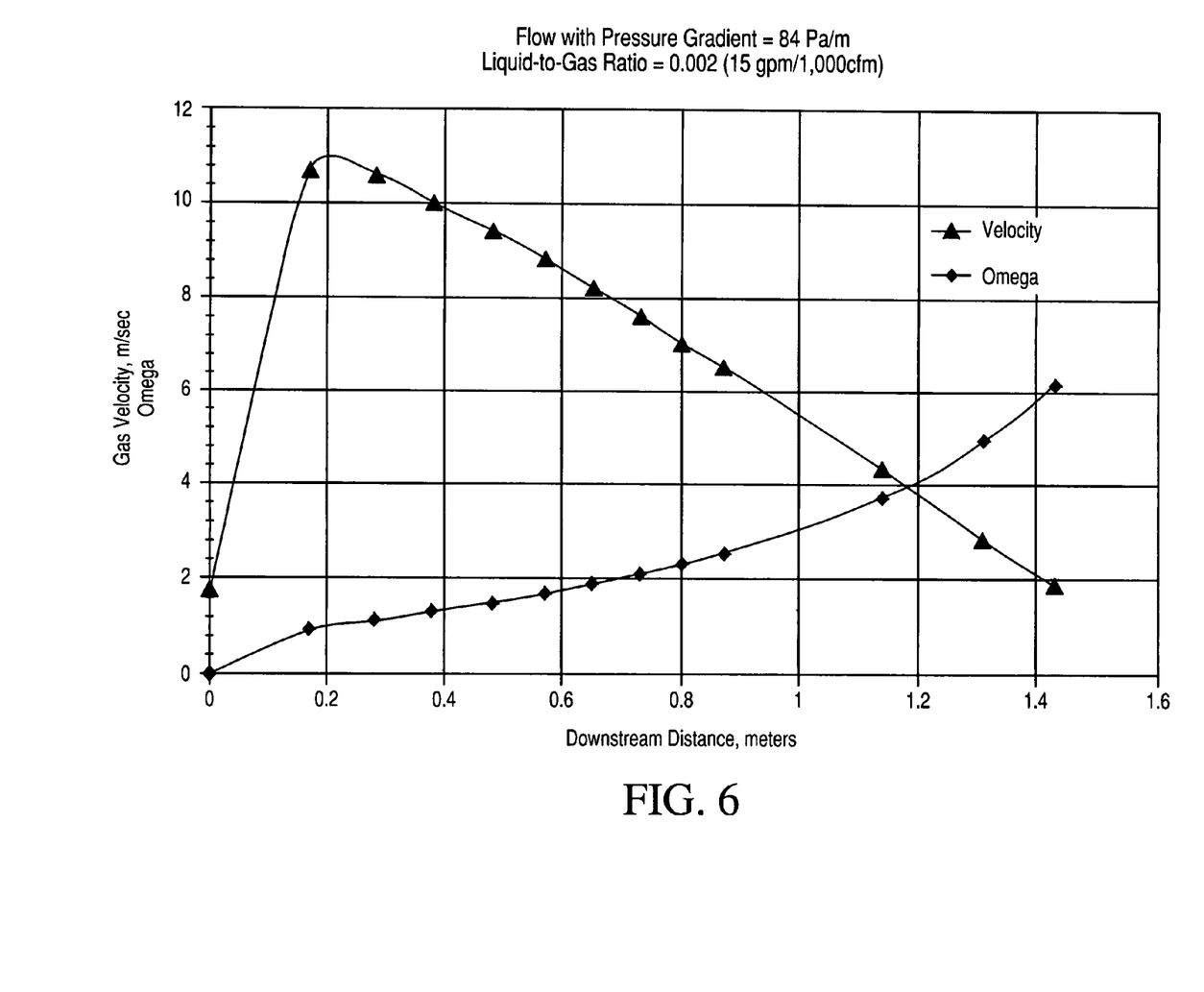
FIG. 6 is a plot of the gas velocity and scrubbing efficiency parameter for the present invention, calculated by a computer simulation program.

FIG. 6 shows the computer simulation results for the geometry specified by this invention, i.e. a reduced scrubbing chamber 18 with constant cross section and with the variable pressure-drop plate 20 placed at the downstream end of the scrubbing chamber 18, with the pressure drop across pressure-drop plate 20 adjusted to equal the initial liquid spray momentum flux, creating a pressure gradient in the scrubbing chamber 18 which opposes the momentum flux given to the gas by the liquid spray. This figure shows that the gas velocity increases to about 11 m/sec at about 0.2 meters downstream from the injection site, and the value of 0 has risen to about 1.2.

Beyond 0.2 meters downstream, the pressure gradient force begins to slow the gas, thus increasing the relative velocity of the droplets and the gas. So, as shown in the figure, $\Omega$ continues to increase, reaching a value of 6.1 about 1.4 meters downstream. The 6.1 value of $\Omega$ yields a scrubber efficiency of 0.99 or 99.8%.

Applicant's calculations indicate that in order to attain the same scrubber efficiency increase to 99.8% without use of the pressure gradient effect, the necessary increase of 0 by a factor of 5.2 would require use of about 5.2 times as much liquid or, alternatively, an increase of about five times the length of the scrubbing chamber 18, in five separate scrubber stages.

So, applicant's computer simulation results confirm what is clear intuitively, that the pressure gradient effect in the present invention, by increasing relative velocity and relative travel path length of the droplets and gas, can significantly increase the scrubbing efficiency of a gas scrubber.

Applicant's calculations indicate that in general best efficiency enhancement results are obtained with the pressure drop across pressure-drop plate 20 being at least equal to a substantial portion of the liquid spray momentum flux.

Some Possible Variations of Embodiments

For example, and not by way of limitation, the present invention might be employed, without departing from the substance thereof, in gas scrubber configurations in which the gas flow is substantially vertical rather than horizontal; or in which pressure-drop plate 20 is replaced by other means of constricting gas flow to cause a pressure drop and a pressure gradient; or in which the vertical sheets 24 are absent; or in which the liquid droplets are uncharged.

Although applicant's FIG. 6 calculations indicate a major efficiency increase can be attained when the pressure drop across pressure-drop plate 20 is equal to the initial liquid spray momentum flux, applicant's calculations do not indicate that said pressure drop need be precisely equal to said momentum flux, to achieve a significant efficiency increase. Rather, a significant efficiency increase effect can occur if said pressure drop is of the same order of magnitude or greater than said momentum flux.

The invention claimed is:

1. Apparatus for removing both particulate pollutants and gaseous pollutants, from a gas to be cleaned, said gas to be cleaned already flowing in an established gas flow stream with a gas flow velocity and momentum flux and gas flow direction upon entry into said apparatus, said gas flow direction defining a downstream direction in said gas flow stream as a direction parallel to said gas flow direction and defining an upstream direction in said gas flow stream as a direction opposite to said gas flow direction, said apparatus comprising:

(a) a pressurized liquid means, being a source providing a pressurized liquid at a controllable liquid pressure;

(b) a droplet production means, connected to said pressurized liquid means, for emitting copious quantities of droplets of said liquid;

(c) an injection means, acting upon said droplets, for injection of said droplets into said gas to be cleaned at a droplet injection site with an initial droplet momentum flux and droplet injection velocity greater than said gas flow momentum flux and gas flow velocity and for intimately mixing said droplets with said gas to be cleaned by causing said droplets to travel through said gas to be cleaned in motion of said droplets with a droplet relative velocity relative to said gas through a length of travel relative to said gas;

(d) a pressure gradient production means, located in said gas stream downstream from said droplet infection site, for creating a pressure gradient of increasing gas pressure in a direction downstream from said droplet injection site, said pressure gradient having a magnitude sufficient to substantially increase said droplet relative velocity relative to said gas by substantially decreasing said velocity of said gas, and to thereby substantially increase said length of travel of said droplets relative to said gas; and (e) a droplet removal means, communicating with said gas to be cleaned and said droplets injected into said gas, for removing said droplets from said gas to be cleaned after said droplets have interacted with said gas, and for collecting together said liquid contained in said droplets;

wherein said pressurized liquid means, said droplet production means, said injection means, and said pressure gradient production means are so configured and operated as to provide said droplets with a combination of size, charge, droplet production rate, and length of travel of said droplets in said gas to be cleaned such as to cause removal of said pollutants with a desired particulate removal efficiency for said particulate pollutants, and to also cause removal of said gaseous pollutants with a desired gaseous pollutant removal efficiency;

wherein said pressure gradient production means comprises an adjustable flow obstruction means, located downstream from said droplet injection site, for partially obstructing flow of said gas past said flow obstruction means;

wherein said adjustable flow obstruction means comprises a pair of substantially parallel perforated metal sheets each having numerous perforations, oriented at least substantially perpendicularly to said gas flow direction, together with adjustment means for adjusting the relative locations of said sheets in a direction transverse to said gas flow direction so as to allow for varying degrees of misalignment of said perforations in said sheets.

2. Method for improving contaminant collection efficiency of a gas scrubber apparatus for removing both particulate pollutants and gaseous pollutants, from a gas to be cleaned, in said scrubber said gas to be cleaned already flowing in an established gas flow stream and gas flow direction upon entry into said scrubber, said gas flow direction defining a downstream direction in said gas flow stream as a direction parallel to said gas flow direction and defining an upstream direction in said gas flow stream as a direction opposite to said gas flow direction, said scrubber comprising a pressurized liquid means, being a source providing a pressurized liquid at a controllable liquid pressure; a droplet production means, connected to said pressurized liquid means, for emitting copious quantities of droplets of said liquid; an injection means, acting upon said droplets, for injection of said droplets into said gas to be cleaned, and for intimately mixing said droplets with said gas to be cleaned by causing said droplets to travel through said gas to be cleaned in motion of said droplets through a length of travel relative to said gas to be cleaned; and a droplet removal means, communicating with said gas to be cleaned and said droplets injected into said gas, for removing said droplets from said gas to be cleaned after said droplets have interacted with said gas, and for collecting together said liquid contained in said droplets, comprising the steps of:

(a) Calculating the magnitude of a pressure gradient of increasing gas pressure downstream from said droplet injection site which would be required in order to increase said length of travel of said droplets through said gas sufficiently to increase said contaminant collection efficiency of said gas scrubber to a desired level; and (b) Creating said magnitude of pressure gradient downstream of said droplet injection site.

\* \* \* \* \*